(12) United States Patent
Nyce

(10) Patent No.: US 9,914,467 B2
(45) Date of Patent: Mar. 13, 2018

(54) ATTACHMENT AND SUPPORT MEMBERS FOR MODULAR BUILDING STRUCTURES

(71) Applicant: Oldcastle Light Building Products, LLC, Atlanta, GA (US)

(72) Inventor: Daniel M. Nyce, Perkasie, PA (US)

(73) Assignee: OLDCASTLE LIGHT BUILDING PRODUCTS, LLC, Atlanta, GA (US)

( * ) Notice: Subject to any disclaimer, the term of this patent is extended or adjusted under 35 U.S.C. 154(b) by 0 days.

(21) Appl. No.: 15/236,184

(22) Filed: Aug. 12, 2016

(65) Prior Publication Data

US 2017/0044755 A1    Feb. 16, 2017

Related U.S. Application Data

(60) Provisional application No. 62/205,327, filed on Aug. 14, 2015.

(51) Int. Cl.
*B62B 1/10* (2006.01)
*B60P 3/40* (2006.01)
*E04B 1/348* (2006.01)

(52) U.S. Cl.
CPC .................. *B62B 1/10* (2013.01); *B60P 3/40* (2013.01); *E04B 1/3483* (2013.01)

(58) Field of Classification Search
CPC ......... B62B 3/06; B62B 3/04; E04B 1/34352; F16B 2/065; F16B 5/0635
USPC ........... 414/458, 668, 785; 248/354.3, 354.4, 248/226.11, 228.1, 228.5, 230.5, 231.85; 280/79.7; 254/2 R; 269/910
See application file for complete search history.

(56) References Cited

U.S. PATENT DOCUMENTS

| | | | |
|---|---|---|---|
| 1,460,283 A * | 6/1923 | Shutsa ..................... | B60M 1/20 191/40 |
| 3,631,999 A | 1/1972 | Walerowski | |
| 3,661,052 A | 5/1972 | Lucien et al. | |
| 3,753,328 A | 8/1973 | Papsco | |
| 3,852,926 A | 12/1974 | Papsco | |
| 4,611,816 A * | 9/1986 | Traister ................ | B65D 90/143 280/43.2 |
| 4,863,334 A * | 9/1989 | Girerd ................... | B60P 1/6445 414/458 |
| 4,866,797 A * | 9/1989 | Vollan ..................... | E04G 25/00 52/126.6 |
| 5,006,032 A * | 4/1991 | Riedl ..................... | B65D 90/18 280/418.1 |
| 5,509,237 A * | 4/1996 | Coulter .................... | B60P 3/36 248/357 |
| 5,727,767 A * | 3/1998 | Jefrey ....................... | B60S 9/22 248/354.3 |
| 5,800,114 A * | 9/1998 | Secondi .................... | B66F 3/46 280/43.23 |
| 6,381,907 B1 * | 5/2002 | MacKarvich ....... | E04B 1/34352 52/105 |

(Continued)

*Primary Examiner* — Kaitlin Joerger
(74) *Attorney, Agent, or Firm* — Sheridan Ross PC

(57) ABSTRACT

A clamp assembly is provided for securing to preexisting studs or support members. The clamp assembly comprises a compression fitting adapted to be secured to a plurality of different sized studs or wall supports, and further to support additional supports including, but not limited, horizontal support members. A support and movement device is further provided that is selectively connectable to clamp and support members of the disclosure.

20 Claims, 7 Drawing Sheets

(56) References Cited

U.S. PATENT DOCUMENTS

| | | | |
|---|---|---|---|
| 6,471,171 B1* | 10/2002 | VanderVelde | H02G 3/32 |
| | | | 248/229.12 |
| 6,520,705 B2* | 2/2003 | Stasney, Jr. | F16B 2/065 |
| | | | 248/72 |
| 7,140,157 B2* | 11/2006 | Oliver | E04B 1/34352 |
| | | | 52/292 |
| 7,325,817 B1* | 2/2008 | Jankowski | B62B 3/108 |
| | | | 254/2 R |
| 7,914,017 B2 | 3/2011 | Setzer, Sr. et al. | |
| 8,534,625 B2* | 9/2013 | Heath | F16B 2/065 |
| | | | 138/106 |
| 2003/0213197 A1* | 11/2003 | Oliver | E04B 1/34352 |
| | | | 52/299 |
| 2007/0020071 A1* | 1/2007 | Williams | B62B 1/268 |
| | | | 414/455 |
| 2008/0236056 A1 | 10/2008 | Hourihan | |
| 2009/0100769 A1 | 4/2009 | Barrett et al. | |
| 2011/0056147 A1 | 3/2011 | Beaudet | |
| 2012/0240482 A1 | 9/2012 | Pitt et al. | |
| 2013/0086849 A1 | 4/2013 | Clouser et al. | |
| 2013/0152485 A1 | 6/2013 | Austin et al. | |

\* cited by examiner

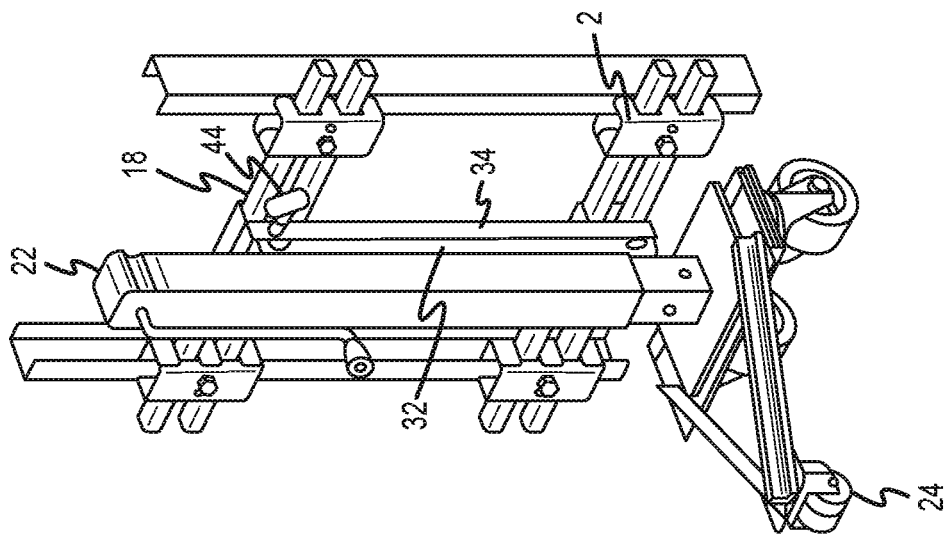
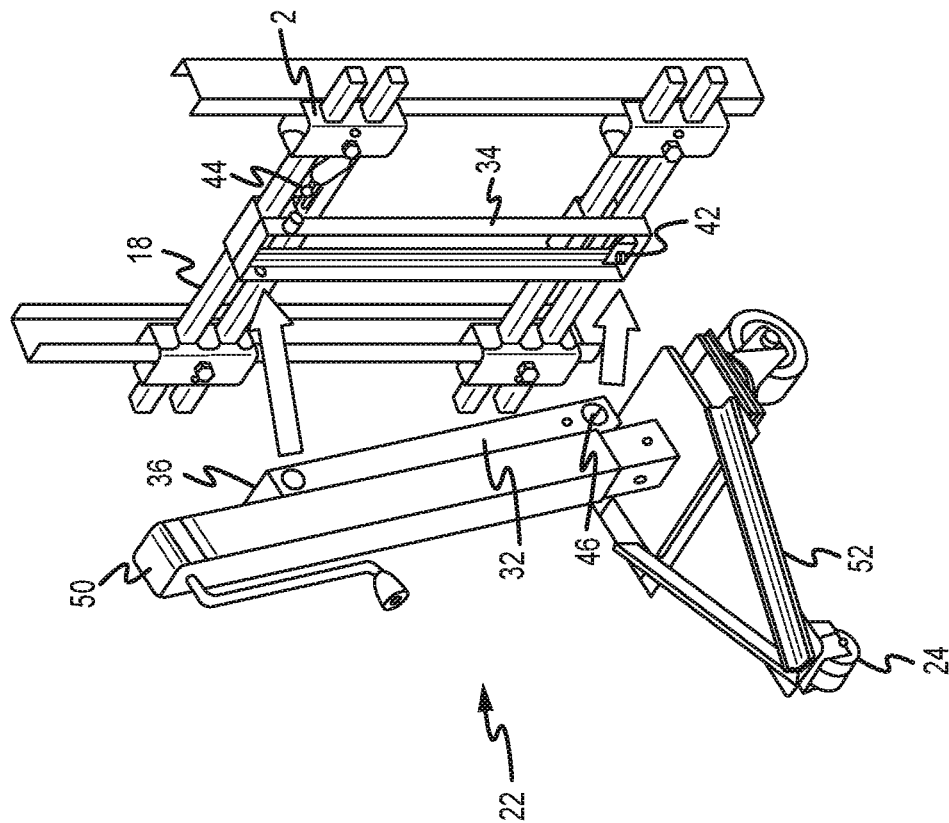

US 9,914,467 B2

ATTACHMENT AND SUPPORT MEMBERS FOR MODULAR BUILDING STRUCTURES

This U.S. Non-Provisional Patent Application claims the benefit of priority from U.S. Provisional Patent Application Ser. No. 62/205,327, filed Aug. 14, 2015, the entire disclosure of which is incorporated by reference herein.

FIELD

The present disclosure relates to clamps and fasteners and devices for connecting to such features. More specifically, the present disclosure relates to a unique clamp for attaching items to preexisting framing stud members. Such items include horizontal support members and various other features to be supported by an existing stud or support, and load-bearing transport devices for supporting, moving and positioning modular building structures such as modular rooms.

SUMMARY

Various embodiments of the present disclosure provide new and useful universal framing stud clamp members. Such embodiments provide devices for securely attaching and securing items such as load bearing bars to framing stud members.

It is one aspect of the present invention to provide a universal framing stud clamp that can be selectively secured to a plurality of different sized features, such as studs of different profiles and gauges.

In one embodiment, a clamp adapted for interconnection to a pre-existing support member is provided, the clamp comprising a first member and a second member, each of the first member and the second member comprising a face plate adapted to contact a support member and apply a compression force thereto. The first member and the second member comprise a plurality of extensions or projections provided substantially perpendicular to the face plates, and void spaces are provided between at least some of the plurality of extensions. A fastener extends through the first member and the second member, and the fastener provides a compression force on the clamp and a support member provided between the first member and the second member.

It is another object of the present disclosure to provide a new and useful moving and positioning device which is more efficient in use and operation and more universally functional and versatile in application and operation than known prior art attachment devices. It is a further object of the present disclosure to provide such a device that is adapted for use with modular building structures, such as modular or prefabricated rooms.

In various embodiments, the present disclosure provides a modular building moving and positioning device that is adapted to move and position modular building or room structures such as bathrooms, kitchens, classrooms, offices, or other modular rooms whether or not specifically referred to herein and which will be recognized by one of skill in the art.

It is also an object of the present disclosure to provide a moving and positioning device comprising the ability to connect to various wall stud profiles and gauges, such that a single transport device is suitable for use with various objects of different size and shape.

U.S. Pat. No. 7,914,017 to Setzer Sr., which is incorporated by reference herein in its entirety, discloses a hand truck with an electronic module, a scale and a control unit. Although various features of Setzer Sr. are contemplated for use in embodiments of the present disclosure, the present disclosure further provides features wherein a hand truck or moving device is adapted to secure to various preexisting support features as shown and described herein.

U.S. Pat. No. 3,631,999 to Keinrich et al., which is hereby incorporated by reference in its entirety, discloses a transporting device with vertical lifting means. Keinrich, however, fails to disclose various features of the present invention including, for example, a device that is adapted to secure to modular building structures and related features.

In certain embodiments, the support, moving and positioning devices disclosed herein are used for moving and lifting stud framed structures into position. Such devices can be separated into sections for easy attachment, and improved productivity on site. A sliding clamp design allows a jack to be positioned on various stud spacing for optimized locating of the jack. Devices of the present disclosure comprise the ability to attach to stud framed walls and lift the unit sufficiently to remove a pallet and subsequently lower the unit completely into a recessed depression, for example. Traditionally this operation would require multiple devices, and significantly more effort of the device, applying equal even pressure to the load bars.

In various embodiments, a method of manipulating and/or transporting a modular building structure is provided. In one embodiment, a method of manipulating a modular building structure comprises the steps of providing a moveable support member for connection to a modular building unit, the support member comprising a horizontal support member with at least one wheel secured thereto, a telescoping vertical support member, a user-interface for selectively extending and retracting said vertical support member, and a load bearing interface for selective attachment to a fixed object. A clamp is provided, the clamp adapted for interconnection to a pre-existing support member and comprising a first member and a second member, each of the first member and the second member comprise a face plate adapted to contact a support member and apply a compression force thereto. The first member and the second member comprise a plurality of extensions or projections provided substantially perpendicular to the face plates, and void spaces are provided between at least some of the plurality of extensions. A fastener extends through the first member and the second member, and the fastener provides a compression force on the clamp and a support member provided between the first member and the second member. The method comprises a step of securing the clamp to at least one structural support which, in certain embodiments, comprises a wall stud or frame member of the modular building unit. The clamp is secured to the structural support at least in part by application of a force to the fastener. At least one horizontal support is provided that extends from or through and is provided in force transmitting communication with the modular building structure by way of the clamp. Once the clamp is secured, the method comprises the step of selectively interconnecting the moveable support member to at least one of the clamp and the horizontal support. Subsequent to connection of the moveable support member, the support member is manipulated to alter at least one of a vertical and horizontal position of the modular building structure. In certain embodiments, the method further comprises securing at least two clamps to at least two structural support members. Additionally, in certain embodiments, it is contemplated that a plurality of moveable support members are provided and secured to the modular building structure by connection to at least one of a clamp and a horizontal support member.

In one embodiment, a moveable support member for connection to a modular building unit is provided, the support member comprising a horizontal support member with at least one wheel secured thereto, a telescoping vertical support member, a user-interface for selectively extending and retracting said vertical support member, and a load bearing interface for selective attachment to a fixed object.

BRIEF DESCRIPTION OF THE FIGURES

FIG. 7A is a perspective view of a mobile support apparatus according to one embodiment of the present disclosure.

FIG. 7B is a perspective view of a mobile support apparatus according to one embodiment of the present disclosure.

DETAILED DESCRIPTION

Figure 1:
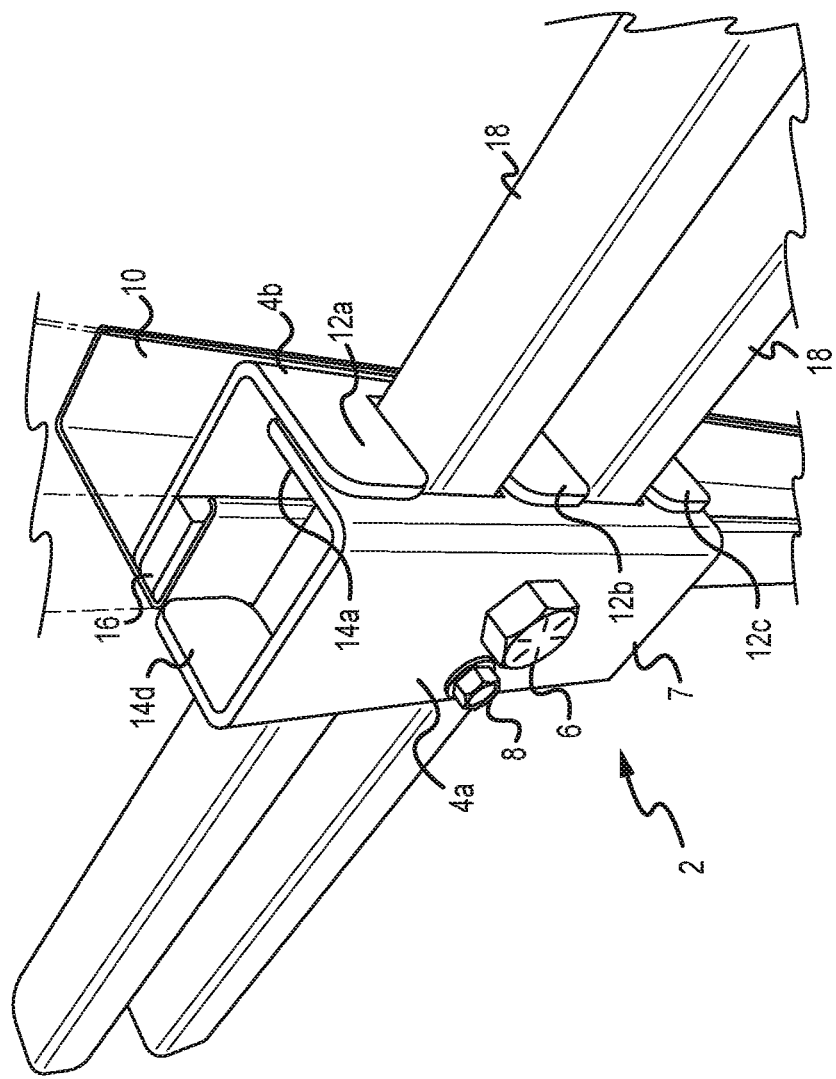
FIG. 1 is a front perspective view of a clamp interconnected to horizontal structural supports according to one embodiment of the present disclosure.

The following is a listing of components according to various embodiments of the present disclosure, and as shown in the drawings:
2 Clamp
4a, 4b First and Second Members
6 Primary Fastener
7 Face Plate
8 Shear Pin
10 Stud Member
12a, 12b, 12c Extensions
14a, 14b Extensions
16 Lip
18 Support Member
20 Device
22 Device
24 Wheels
26 Platform Support Portion
28 Main Lifting Jack Body
30 User Interface
32 Load Bearing Extension
34 Load Bearing Bracket
36 First Aperture
40 Tray
42 Footer
44 Pin
46 Second Aperture
50 Vertical Support
52 Horizontal Support FIG. 1 is a perspective view of a clamp 2 for securing to various objects including, but not limited to, load bearing bars and framing stud members. As shown in FIG. 1, a clamp 2 comprises a first member 4a and a second member 4b, the first and second members 4a, 4b are provided in opposing relationship and are adapted to be secured to at least one of a stud member 10 and an additional support member 18. In the embodiment of FIG. 1, the support member 18 comprises a substantially horizontally extending bar or beam for supporting various objects such as construction modules or moveable bathroom pods. The embodiment of FIG. 1 provides a clamp that is adapted to secure to a stud member 10 and an additional support member 18 and wherein the additional support member 18 is at least partially supported and takes advantage of the structural integrity of the stud member 10.

FIG. 1 provides a clamp 2 in communication with a stud member 10 and wherein the stud member 10 comprises a c-shaped channel member of formed sheet metal or other materials. It will be recognized, however, that clamps 2 of the present disclosure may be secured to a variety of studs with any variety of geometric shapes, and the disclosure is not limited to devices for securing to the particular stud 10 provided in FIG. 1.

Figure 2:
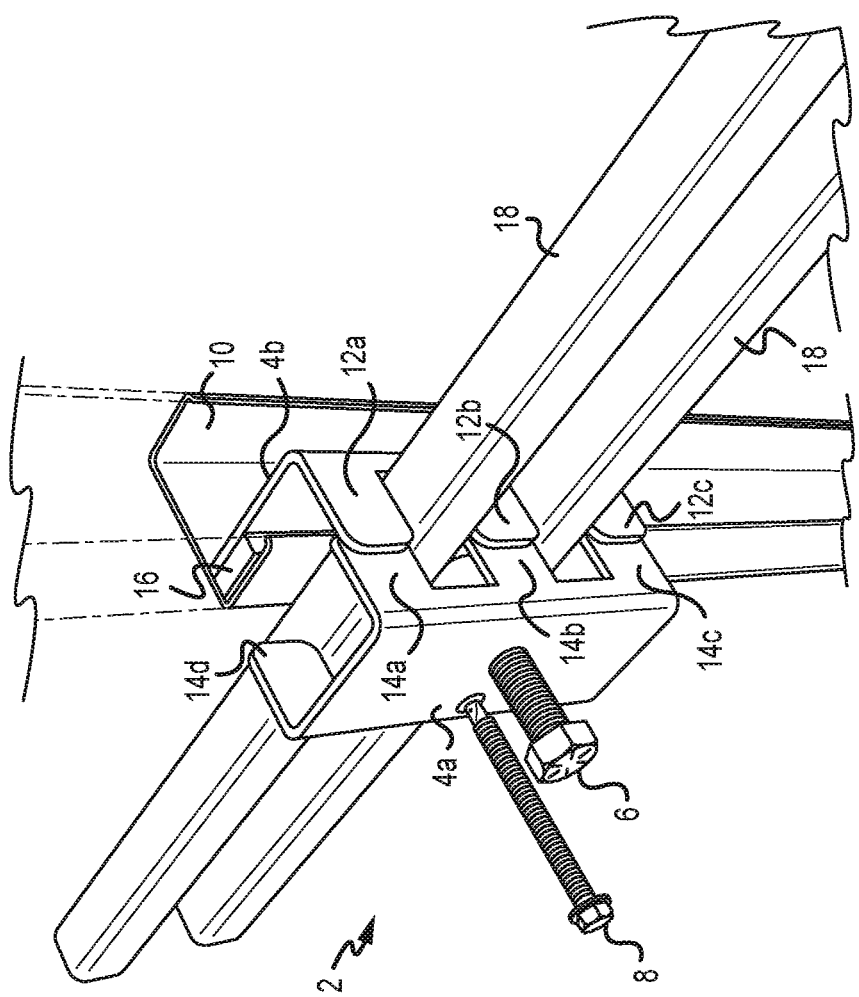
FIG. 2 is a front perspective view of a clamp according to the embodiment of FIG. 1 and further depicting fastening hardware associated with the clamp.

As shown in FIG. 1-2, the first member 4a of the clamp 2 comprises first, second, third and fourth extensions 14a, 14b, 14c, 14d extending from a face plate 7. The extensions comprise substantially parallel extensions with space provided therebetween to receive and support the support member(s) 18. The second member 4b of the clamp 2 comprises corresponding extensions 12a, 12b, 12c of similar construction and spacing, and wherein an internal width of the extensions 12 of the second member 4b is slightly greater than an external width of the extensions 14 of the first member 4a such that the first member 4a is at least partially received within the second member 4b when provided in an assembled state (see FIG. 1, for example).

In the embodiment of FIGS. 1-2, the second member 4b comprises a lip 16 for placement within the c-channel of the stud 10. In alternative embodiments, however, it is contemplated that the first 4a and second 4b members surround a stud 10 or similar member, rather than communicating with an internal surface of the stud member as shown in FIG. 1-2.

The first 4a and second 4b members of the clamp 2 are selectively interconnected and secured to a stud 10 and/or support member 18 by a primary fastener 6. The clamp 2 further comprises a shear pin 8. In preferred embodiments, the primary fastener 6 extends through the first member 4a and the second member 4b, but does not pass through the stud 10. Rather, the primary fastener 6 is laterally offset from the stud 10 and creates a clamping force wherein the first 4a and second 4b members are compressed on either side of the stud 10, thereby securing the clamp assembly 10 in a secure and fixed position. In alternative embodiments, the primary fastener 6 extends through the stud 10. Such embodiments typically require forming an aperture and/or tapping the stud 10. In certain embodiments, a shear pin 8 is inserted through the first member 4a to prevent the clamp from slipping when put under load. In certain embodiments, the primary fastener 6 provides a clamping or compression force and comprises a primary load-bearing member. It will be recognized, however, that even when the primary fastener 6 is provided with sufficient torque, some spacing may exist and result in vertical displacement when the device 2 is put under load. The shear pin 8 thus provides additional securing features to prevent such slip.

As further shown in FIGS. 1-2, the first member 4a comprises a substantially symmetrical member with three pairs of parallel extending members 14 and associated channels or spaces provided therebetween for receiving the supports 18. The second member 4b comprises a generally "L" shaped member with one end comprising projections 12 and an opposing end comprising a lip 16 for connecting to the stud 10. In certain embodiments, the lip 16 extends along an entire length of the member 4b and comprises a width that is approximately equal to the width of the inside of a steel stud framing member 10. The primary fastener 6 may be selectively adjusted, and provides means for vertically adjusting the clamp 2 and/or support members 18 when loosened.

Figure 3:
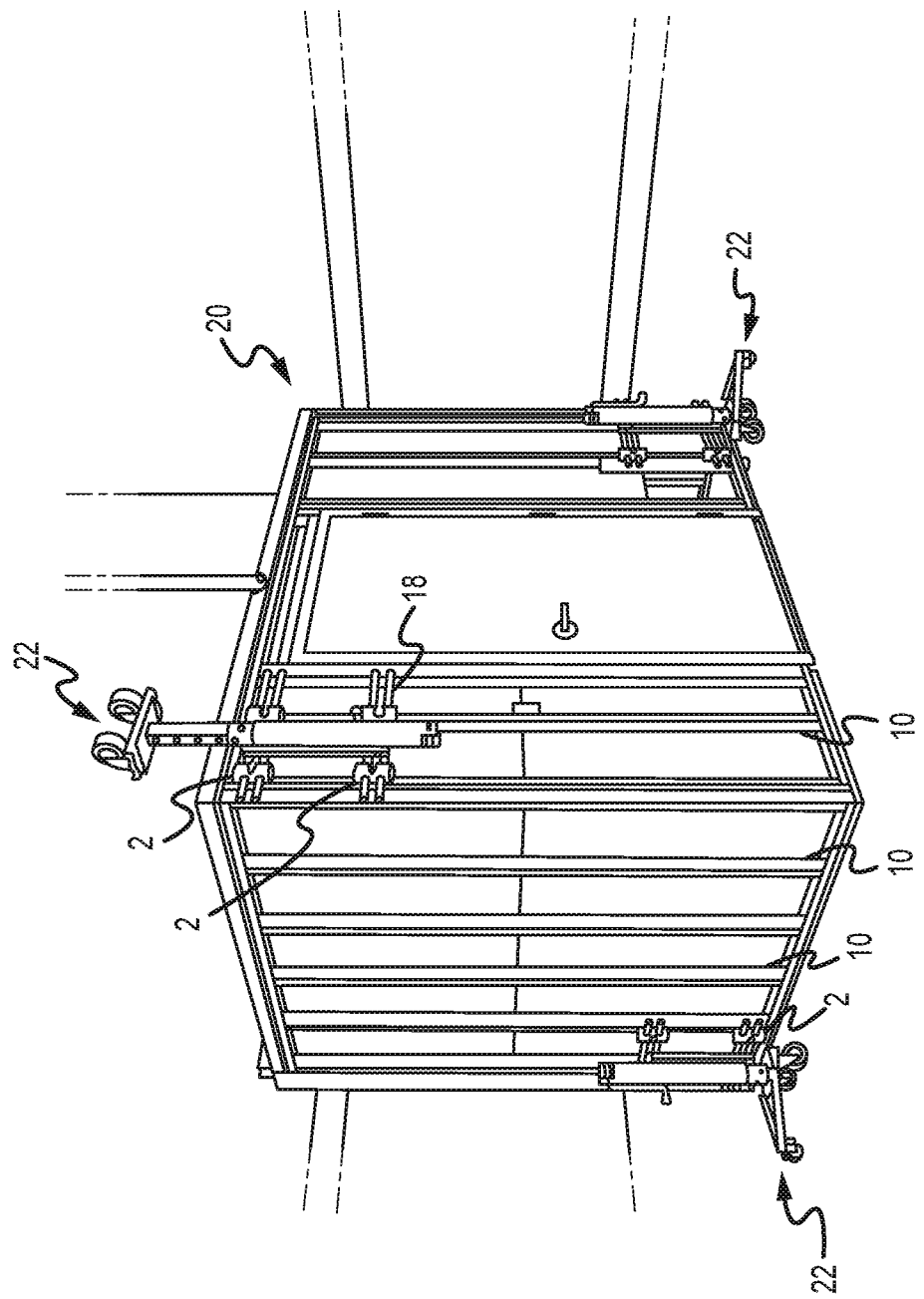
FIG. 3 is a perspective view of a clamp according to one embodiment of the present disclosure and wherein the clamp is interconnected to the framework of a moveable bathroom pod.
Figure 4:
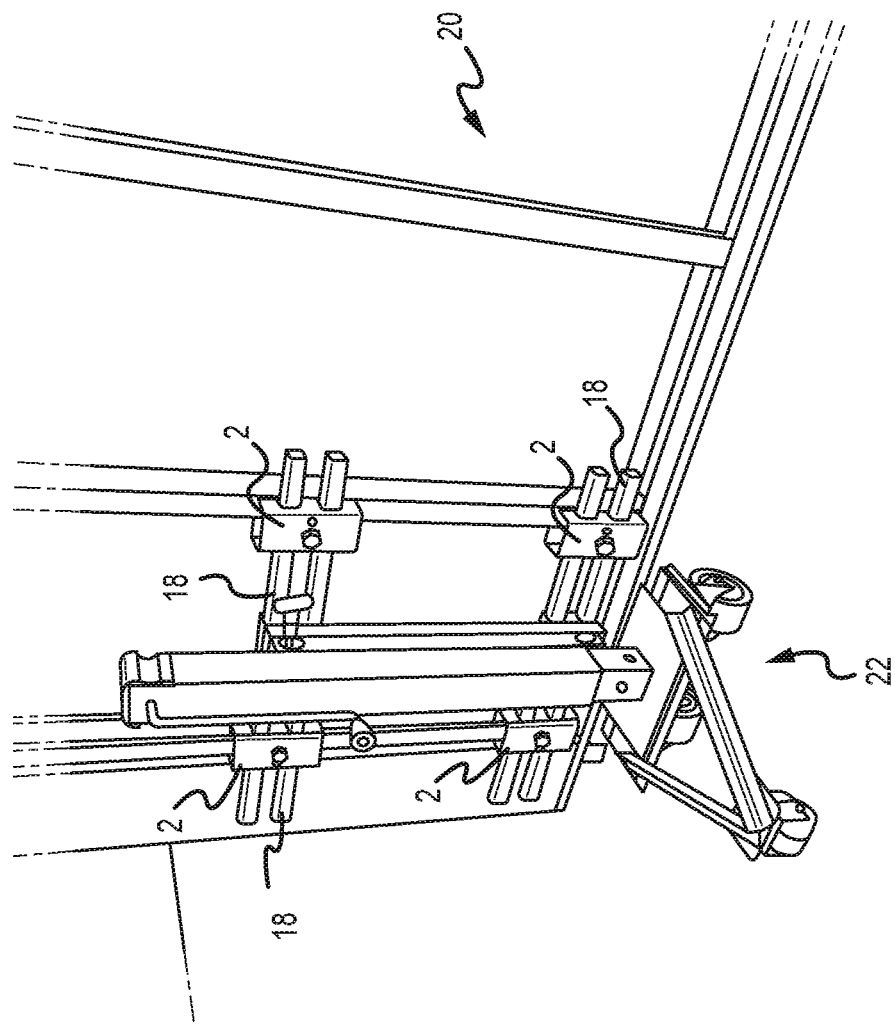
FIG. 4 is a perspective view of a clamp according to one embodiment of the present disclosure and wherein the clamp is in communication with additional features.

FIGS. 3-4 are perspective views of a modular building unit 20 comprising studs 10 or wall supports, wherein clamp members 2 as shown and described herein are secured to the studs 10. The clamp members 2 are also provided in supporting relationship with horizontal supports 18. The horizontal supports 18 are in further communication with one or more weight bearing devices 22. The weight bearing devices 22 of FIGS. 3-4 comprise dollies or hand-trucks adapted to support and transport the modular building unit 20 as may be desired, and including support with respect to both a floor and ceiling surface. In various embodiments, the device 22 comprise hand-operate hydraulic lift features to lift and lower a pod or building unit.

Although FIGS. 3-4 depict one embodiment of a clamp 2 and a particular use for such clamps, it will be expressly recognized that the present disclosure is not limited to the support members 18 or additional devices 20, 22 of FIGS. 3-4. Indeed, it is contemplated that the support clamps 2 as shown and described herein may be attached to wall studs or support members and further support any number and any type of additional components including, but not limited to, lighting elements, beams, shelving, vanities, etc.

In FIGS. 3-4, a plurality of clamps 2 are provided for handling and moving processes to push, pull, lift, or support a stud framed structure. For example, clamps 2 and associated features as shown and described herein may be used for lifting or moving a modular unit such as a room, bathroom, kitchen, classroom, garage, or other similar modular structure.

Figure 5:
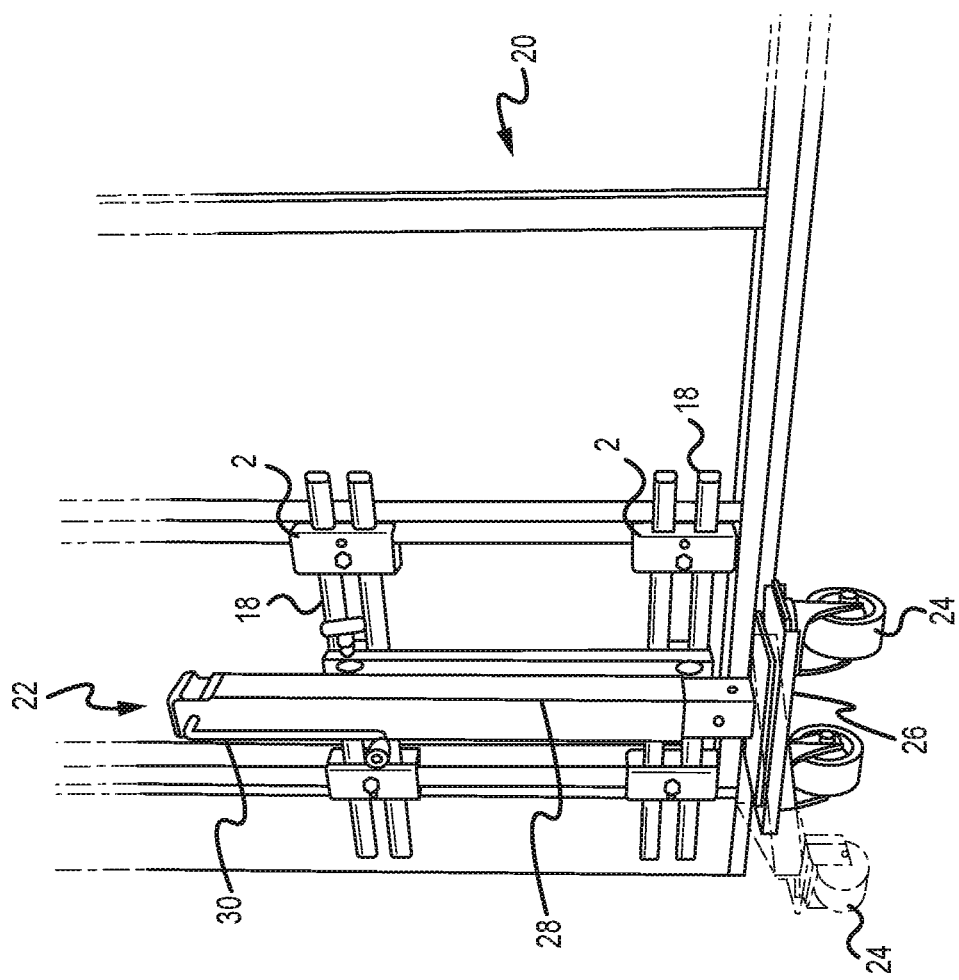
FIG. 5 is a perspective view of a mobile support apparatus according to one embodiment of the present disclosure.

Various embodiments of the present disclosure provide a device for supporting, moving and positioning modular building structures. As shown in FIG. 5, a preferred embodiment of a device 22 is provided that comprises a platform support portion 26 having a plurality of wheels 24 for enabling rolling movement of the device. A main lifting jack body 28 is provided and extends upwardly from the platform support portion 26. As shown in the FIG. 5, a plurality of clamps 2 and associated support members 18 as shown and described herein are provided in connection with a modular building unit 20. The lifting and support device 22 securely attaches to at least one support member 18 as shown in FIG. 5 and provides at least one means for lifting, moving, and/or supporting a modular building unit 20 such as a modular or prefabricated room. As further described herein, the support device 22 comprises lifting or jack features and a user interface 30 to allow a user to apply force to the device 22 and associated components.

Figure 6:
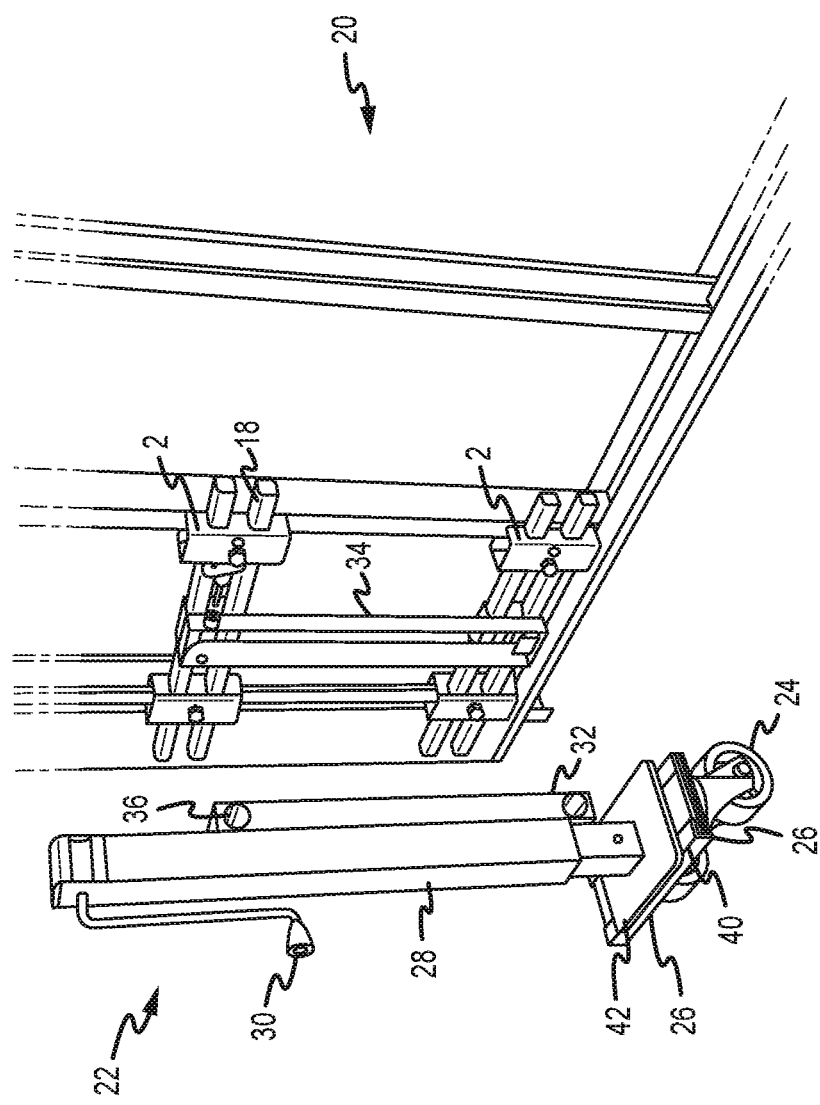
FIG. 6 is a perspective view of a mobile support apparatus according to one embodiment of the present disclosure.

FIG. 6 is a perspective view of a modular building unit 20 and a lifting and support device 22 for selectively securing to the modular building unit 20. As shown, the support device 22 comprises a platform member 26 with a plurality of wheels 24, and a support member 28 extending from the platform member 26. In certain embodiments, the platform member 26 comprises a footer 42 of the support that is selectively connected to a horizontal support or tray 40 of the platform member 26. In such embodiments, the support member 28 may be removed from the wheels 24 and tray 40 and the footer 42 may be employed wherein the support member 28 is intended to be used as a basic support without the ability to roll or transport the device. In various embodiments, the support device 22 comprises a height of between approximately 20 and 50 inches, and preferably of approximately 41 inches. In various embodiments, the support device 22 comprises a width of between approximately 5 and 30 inches, and preferably of approximately 20 inches.

In the embodiment of FIG. 6, the support member 28 extends substantially perpendicularly from the platform 26. It will be recognized, however, that various configurations and relative positions of certain portions of the support member 28 are contemplated by embodiments of the present disclosure. At least a portion of the support member 28 is translatable by operation of a user-interface 30 which comprises a hand crank in the depicted embodiment. Movement of the user-interface thus enables a force to be applied to the support device 22 and any associated objects. In certain embodiments, hydraulic jack features such as those described in U.S. Pat. No. 3,661,052 to Ghobert et al., which is hereby incorporated by reference in its entirety, are contemplated for use with the support device 22.

As shown in FIG. 6, a load-bearing bracket 34 is provided and extends between at least two support members 18. The load-bearing bracket 34 is adapted to connect to a load-bearing extension 32 of the support device 22. As shown in FIG. 7, hardware including brackets 2, support members 18, and load-bearing brackets 34 are secured to a modular building structure 20 at various locations on the structure 20. The hardware comprises permanent and semi-permanent hardware that is to remain connected to the structure, and such that support devices 22 may be quickly and easily connected to the structure 20 when needed, and removed when not desired. As further shown in FIG. 7, the load-bearing extension 32 of the support device 22 comprises apertures 36. The apertures 36 are provided to receive support members 18 and comprise an alternative connection means to the connection of the load-bearing extension 32 to a load-bearing bracket 34.

FIGS. 7A and 7B are perspective views of the support device 22 according to an embodiment of the present disclosure. FIG. 7A depicts the support device 22 in a detached position from a load-bearing bracket 34. FIG. 7B depicts the support device 22 in a secured position with a load-bearing bracket 34 and associated components and structures. The attachment of the support device 22 is depicted wherein the support device 22 comprises a load bearing extension 32 in the form a steel tube. The extension 32 comprises a first aperture 36 and a second aperture 46, wherein both apertures extend laterally through the load-bearing extension 32. In preferred embodiments, the load-bearing extension comprises a tube that is open at least at a bottom end of the tube. It will be recognized that the term "tube" is not limited to a device of any particular cross-section and, for the purposes of the present disclosure, may be of round, partially-round, or rectangular cross-section.

In FIG. 7A, the support device 22 is depicted as being rotated or tilted with an upper portion of the device 22 rotated away from the bracket 34. This rotation may be accomplished in various ways. For example, in one embodiment, a rear wheel 24 or support is provided in an elevated position relative to the forward wheels, thereby allowing a user to tilt the device in the depicted manner. In alternative embodiments, at least one of the vertical support portion 50 of the support 22 and horizontal support portion(s) 52 are hinged or rotatable relative to the base of the support device 22. In certain embodiments, however, the various members of the support device 22 are in fixed relative position to each other and the device 22 is tilted or rotated through standard manual manipulation. The rotation of the support device 22 allows the open bottom portion of the extension 32 to receive a projection 42 provided on a lower portion of the bracket 34.

After the extension 32 receives or otherwise attaches to the projection 42, the support device 22 is rotated such that an upper portion of the device 22 is brought into contact or a mating position with the bracket 34. An upper portion of the extension 32 comprises an aperture 36. The aperture 36 is provided and sized to receive a pin associated with or passing through the bracket 34. In certain embodiments, a lower portion of the extension 32 also comprises an aperture for receiving a pin to further secure the device 22 and extension 32 to the bracket 34 and associated structure(s).

Although various features of the support device 22 and bracket 34 are described with respect to FIGS. 7A and 7B, it will be recognized that the present disclosure contemplates rearrangement of the layout and placement of such features. For example, a support device 22 is also contemplated as being inserted into a bracket 34 with an opposite rotation as described above. In such embodiments, features such as the protrusion 42 and various apertures may be relocated to accommodate for such rotation. It will further be recognized that placement of the apertures and pin 44 is not critical and may be varied. In preferred embodiments, however, it is contemplated that such features are provided proximal an upper and lower portion of the extension 32 and bracket 34.

The bracket 34 is contemplated as being secured to additional support members 18 through a variety of means including, but not limited to, welding, U-bolts, and various known fasteners. It is contemplated that the bracket 34 will accommodate a substantial portion of the weight of an object to which it is attached, at least in certain applications and instances. As such, the securing of the bracket 34 to the support members 18 must be of sufficient structural integrity to withstand such loads. The specific method and means of attachment may be varied based on the size and weight of the structure, the number of brackets 34 to be used, etc.

Lifting and support devices of the present disclosure are contemplated for use in pairs or multiples as part of a handling and moving process to push, pull, lift, or support a stud framed structure. Contemplated applications for the device include, but are not limited to, lifting or moving a modular unit such as a building, room, bathroom, kitchen, classroom, garage, or other similar modular structure.

What is claimed is:

1. A selectively removable apparatus for interconnection to a pre-existing support member, the apparatus comprising:
    a clamp comprising a first member and a second member, each of the first member and the second member comprising a face plate and adapted to contact a first support member and a second support member and apply a compression force thereto;
    wherein the first support member and the second support member are disposed perpendicularly to each other;
    the first member and the second member comprising a plurality of extensions provided substantially perpendicular to the face plates, and wherein void spaces are provided between at least some of the plurality of extensions;
    a fastener extending through the first member and the second member, and wherein the fastener is adapted to provide a compression force on the clamp and at least one of the first support member and the second member.

2. The apparatus of claim 1, further comprising a transport device which is operably engaged to the clamp.

3. The apparatus of claim 2, wherein the transport device includes wheels on a distal end.

4. The apparatus of claim 1, wherein the second support member comprises a substantially horizontally extending bar or beam for supporting various objects.

5. The apparatus of claim 4, wherein the second support member extends through at least one of the void spaces.

6. The apparatus of claim 1, wherein the second member comprises a substantially L-shaped bracket operable to be secured to a wall stud.

7. The apparatus of claim 1, further comprising at least one of a shear pin and a bolt extending through at least one of the first member and the second member.

8. A system for selective interconnection to a pre-existing support member, the system comprising:
    a clamp comprising a first member and a second member, each of the first member and the second member operable to contact a support member and apply a compression force thereto;
    the first member and the second member comprising a plurality of extensions, and wherein void spaces are provided between at least some of the plurality of extensions;
    a threaded fastener extending through the first member and the second member, and wherein the fastener is adapted to provide a compression force on the clamp, the compression force operable to secure the clamp to the support member;
    a transport device operatively engaged to the clamp; and
    at least one secondary support member, wherein the secondary support member comprises a substantially horizontally extending bar or beam for supporting various objects.

9. The system of claim 8, wherein the transport device comprises a dolly.

10. The system of claim 9, wherein the clamp is secured to the secondary support member.

11. The system of claim 8, wherein the secondary support member extends through at least one of the void spaces.

12. The system of claim 8, wherein the second member comprises a substantially L-shaped bracket operable to be secured to a wall stud.

13. The system of claim 8, further comprising at least one of a shear pin and a bolt extending through at least one of the first member and the second member.

14. A system for selective interconnection to a pre-existing support member, the system comprising:
    a clamp comprising a first member and a second member, each of the first member and the second member operable to contact a first support member and apply a compression force thereto;
    the first member and the second member comprising a plurality of extensions provided substantially perpendicular to the face plates, and wherein void spaces are provided between at least some of the plurality of extensions;
    at least one secondary support member extending through at least one of the void spaces, wherein the secondary support member comprises a substantially horizontally extending bar or beam;

a threaded fastener extending through the first member and the second member, and wherein the fastener is adapted to provide a compression force on the clamp, the compression force operable to secure the clamp to at least one of a wall stud, the first support member and the secondary support member.

15. The system of claim 14, wherein the at least one secondary support member comprises at least one lift point for receiving a load.

16. The system of claim 14, wherein the secondary member comprises a substantially L-shaped bracket operable to be secured to a wall stud.

17. The system of claim 14, further comprising at least one of a shear pin and a bolt extending through at least one of the first member and the second member.

18. The system of claim 14, wherein the first member comprises three pairs of adjacent extensions, and two pair of corresponding void spaces.

19. The system of claim 18, wherein the system comprises a plurality of secondary support members, and wherein the secondary support members extend through the void spaces.

20. The system of claim 17, wherein the at least one of a shear pin and a bolt comprises a threaded bolt extending through the first member and the second member.

* * * * *